US012109902B2

(12) United States Patent
Hitchcock et al.

(10) Patent No.: US 12,109,902 B2
(45) Date of Patent: Oct. 8, 2024

(54) RESISTOR MODULE FOR A CHARGING INLET ASSEMBLY

(71) Applicant: TE Connectivity Solutions GmbH, Schaffhausen (CH)

(72) Inventors: Matthew Bryan Hitchcock, Hershey, PA (US); Clara Marguerite Rhodes, Winston Salem, NC (US); Jeremy Christin Patterson, Winston Salem, NC (US); Aaron James de Chazal, Rochester, MI (US)

(73) Assignee: TE Connectivity Solutions GmbH (CH)

( * ) Notice: Subject to any disclaimer, the term of this patent is extended or adjusted under 35 U.S.C. 154(b) by 380 days.

(21) Appl. No.: 17/701,827

(22) Filed: Mar. 23, 2022

(65) Prior Publication Data

US 2023/0302929 A1    Sep. 28, 2023

(51) Int. Cl.
*B60L 53/16* (2019.01)
*H01R 13/66* (2006.01)

(52) U.S. Cl.
CPC .......... *B60L 53/16* (2019.02); *H01R 13/6616* (2013.01)

(58) Field of Classification Search
CPC ..... B60L 53/16; H01R 13/6616; H01R 24/30; H01R 2107/00; H01R 24/86; H01R 2201/26; H01R 4/64; Y02T 10/70; Y02T 10/7072; Y02T 90/14
See application file for complete search history.

(56) References Cited

U.S. PATENT DOCUMENTS

2022/0385001 A1\* 12/2022 Zhu .................... H01R 13/6683

FOREIGN PATENT DOCUMENTS

WO    WO-2014147756 A1 \*    9/2014    ......... H01R 13/6616
WO    WO-2014147762 A1 \*    9/2014    .......... B60L 11/1818

\* cited by examiner

*Primary Examiner* — Travis S Chambers

(57) ABSTRACT

A resistor module includes a resistor module housing having an inner cavity. A proximity contact and a ground contact are received in the inner cavity and held by the resistor module housing. A proximity wire, electrically connected to a proximity terminal of the charging inlet assembly, is electrically connected to the proximity contact. A ground wire, electrically connected to a ground terminal of the charging inlet assembly, is electrically connected to the ground contact. A resistor element is received in the inner cavity and coupled to mating ends of the proximity and ground contacts. The resistor element is electrically connected to the proximity terminal through the proximity wire and the proximity contact and is electrically connected to the ground terminal through the ground wire and the ground contact.

20 Claims, 4 Drawing Sheets

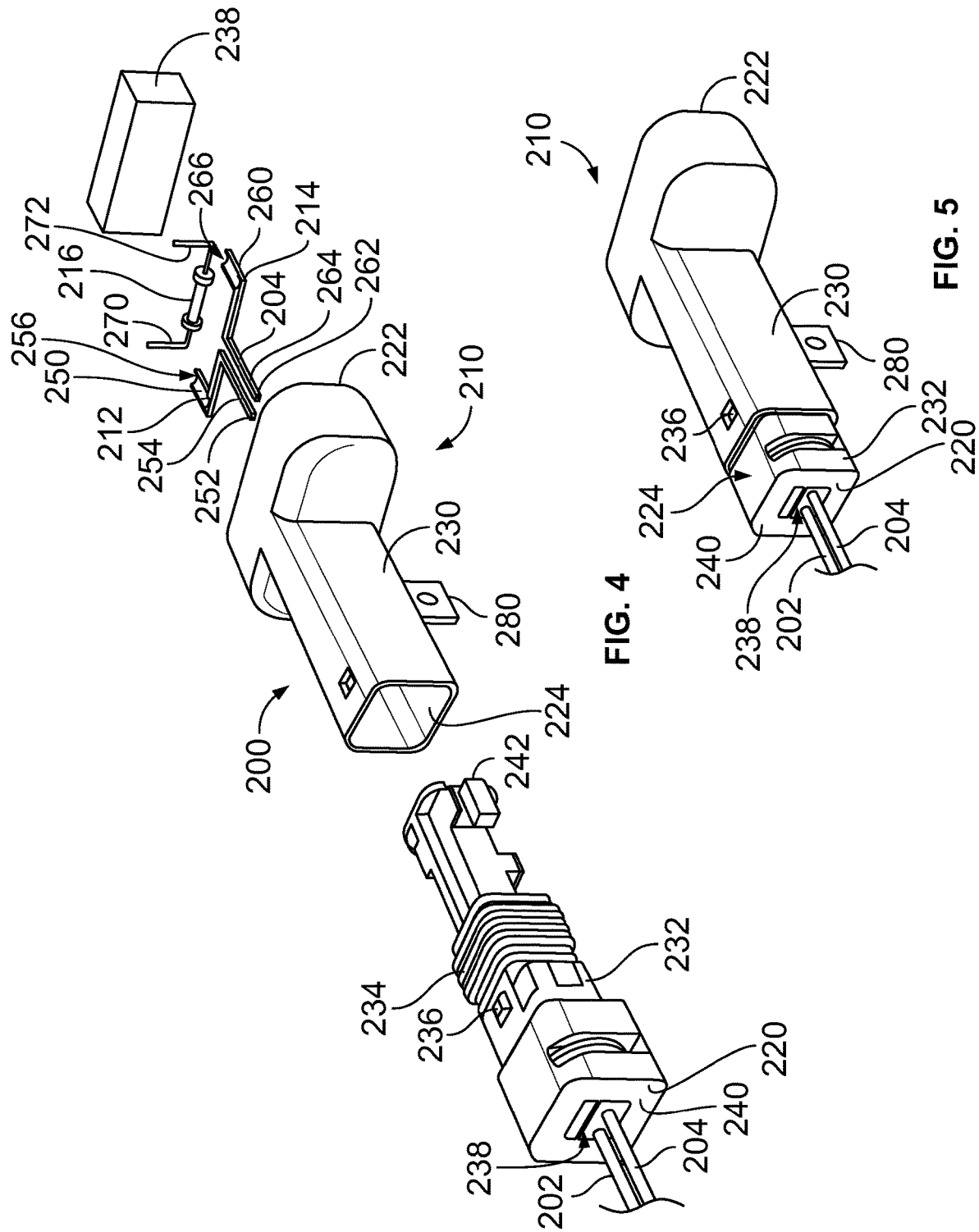

RESISTOR MODULE FOR A CHARGING INLET ASSEMBLY

BACKGROUND OF THE INVENTION

The subject matter herein relates generally to charging inlet assemblies.

Electric vehicles (EV) and hybrid electric vehicles (HEV) include battery systems for operating the vehicles. The battery systems are charged by a charging connector, which is coupled to a charging inlet assembly of the vehicle. Known charging inlet assemblies of vehicles are not without disadvantages. For instance, known charging inlet assemblies include multiple components and are bulky occupying significant space within the panels of the vehicle. It is desirable to reduce the overall size of known charging inlet assemblies.

A need remains for a compact and reliable a charging inlet assembly.

BRIEF DESCRIPTION OF THE INVENTION

In embodiments herein, a resistor module is provided for a charging inlet assembly of an electric vehicle. The resistor module includes a resistor module housing having a first end and a second end opposite the first end and having an inner cavity. A proximity contact is received in the inner cavity and held by the resistor module housing. The proximity contact includes a mating end and a wire end. The wire end of the proximity contact is connected to a proximity wire configured to be electrically connected to a proximity terminal of the charging inlet assembly. A ground contact is received in the inner cavity and held by the resistor module housing. The ground contact includes a mating end and a wire end. The wire end of the ground contact is connected to a ground wire configured to be electrically connected to a ground terminal of the charging inlet assembly. A resistor element is received in the inner cavity of the resistor module housing. The resistor element is coupled to the mating end of the proximity contact and the mating end of the ground contact. The resistor element is configured to be electrically connected to the proximity terminal of the charging inlet assembly through the proximity wire and the proximity contact and configured to be electrically connected to the ground terminal of the charging inlet assembly through the ground wire and the ground contact.

In embodiments herein, a charging inlet assembly for an electric vehicle is provided including a charging inlet housing extending between a front and a rear. The charging inlet housing has a chamber at the rear. The housing has a power connector at the front for receiving a charging connector. The power connector includes terminal channels between the front and the rear. Power terminals are coupled to the housing. Each of the power terminals include a mating pin and a terminating end opposite the mating pin. The mating pin is positioned in the corresponding terminal channel for mating with the charging connector. The terminating end is positioned in the chamber at the rear of the housing. A proximity terminal is coupled to the housing. The proximity terminal includes a mating pin and a terminating end opposite the mating pin. The mating pin of the proximity terminal is positioned in the corresponding terminal channel for mating with the charging connector. The terminating end of the proximity terminal is positioned in the chamber at the rear of the housing. A ground terminal is coupled to the housing. The ground terminal includes a mating pin and a terminating end opposite the mating pin. The mating pin of the ground terminal is positioned in the corresponding terminal channel for mating with the charging connector. The terminating end of the ground terminal is positioned in the chamber at the rear of the housing. The charging inlet assembly includes a resistor module including a resistor module housing having an inner cavity. A proximity contact is received in the inner cavity and held by the resistor module housing. A ground contact is received in the inner cavity and held by the resistor module housing. A resistor element is received in the inner cavity of the resistor module housing. The proximity contact is connected to a proximity wire electrically connected to the proximity terminal of the charging inlet assembly. The ground contact is connected to a ground wire electrically connected to the ground terminal of the charging inlet assembly. The resistor element is coupled to the proximity contact and the ground contact. The resistor element is electrically connected to the proximity terminal through the proximity wire and the proximity contact. The resistor element is electrically connected to the ground terminal through the ground wire and the ground contact.

In embodiments herein, a charging inlet assembly for an electric vehicle is provided including a charging inlet housing extending between a front and a rear. The charging inlet housing has a chamber at the rear. The housing has a power connector at the front for receiving a charging connector. The power connector includes terminal channels between the front and the rear. Power terminals are coupled to the housing. Each of the power terminals includes a mating pin and a terminating end opposite the mating pin. The mating pin is positioned in the corresponding terminal channel for mating with the charging connector. The terminating end is positioned in the chamber at the rear of the housing. A proximity terminal is coupled to the housing. The proximity terminal includes a mating pin and a terminating end opposite the mating pin. The mating pin of the proximity terminal is positioned in the corresponding terminal channel for mating with the charging connector. The terminating end of the proximity terminal is positioned in the chamber at the rear of the housing. A ground terminal is coupled to the housing. The ground terminal includes a mating pin and a terminating end opposite the mating pin. The mating pin of the ground terminal is positioned in the corresponding terminal channel for mating with the charging connector. The terminating end of the ground terminal is positioned in the chamber at the rear of the housing. The charging inlet assembly includes a resistor module including a resistor element electrically connected to the proximity terminal and the ground terminal. The resistor element is located exterior of the charging inlet housing.

BRIEF DESCRIPTION OF THE DRAWINGS

FIG. 4 is an exploded view of a resistor module of the charging inlet assembly in accordance with an exemplary embodiment.

FIG. 5 is an assembled view of the resistor module in accordance with an exemplary embodiment.

DETAILED DESCRIPTION OF THE INVENTION

Figure 1:
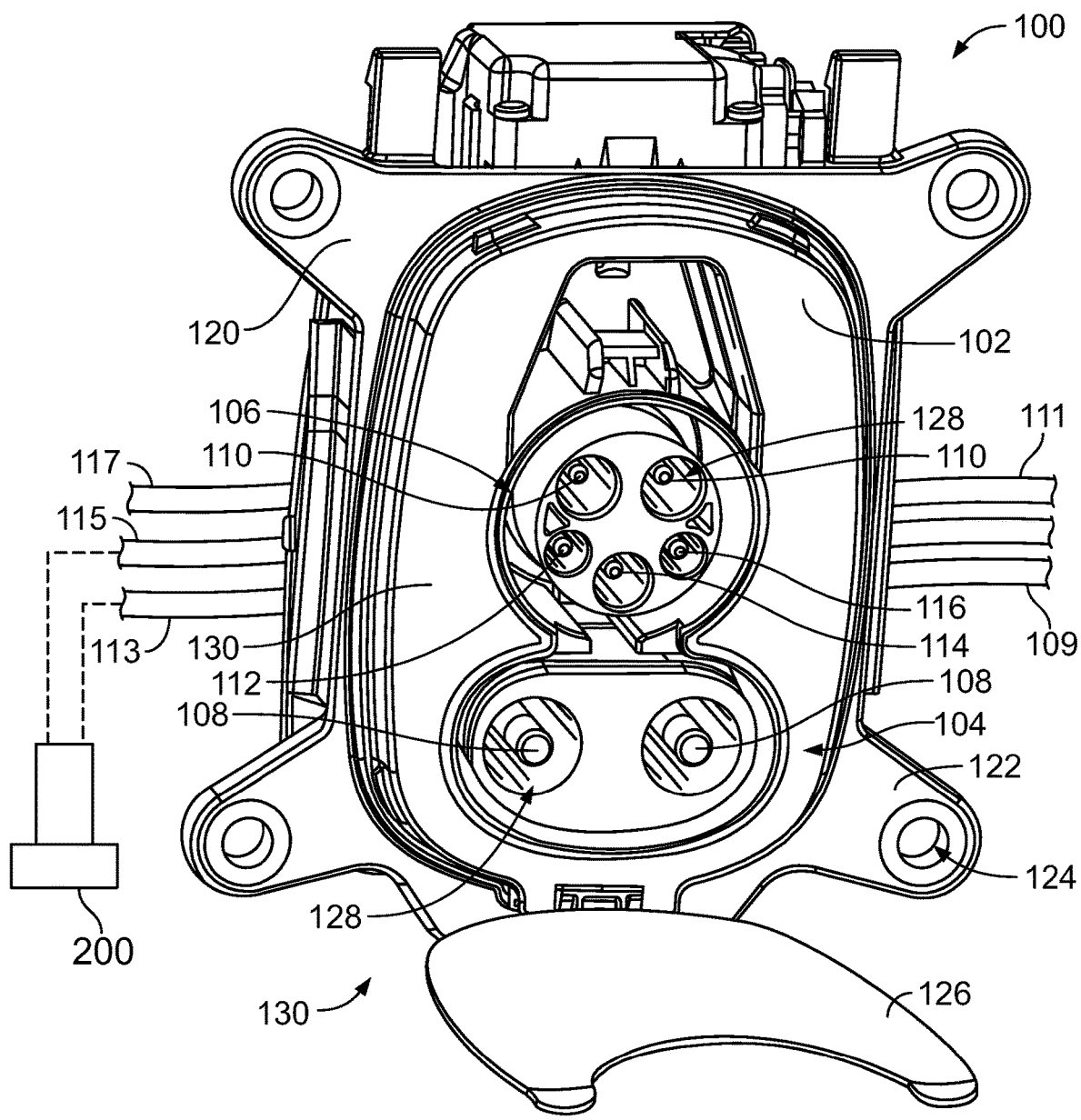
FIG. 1 is a front perspective view of a charging inlet assembly in accordance with an exemplary embodiment.
Figure 2:
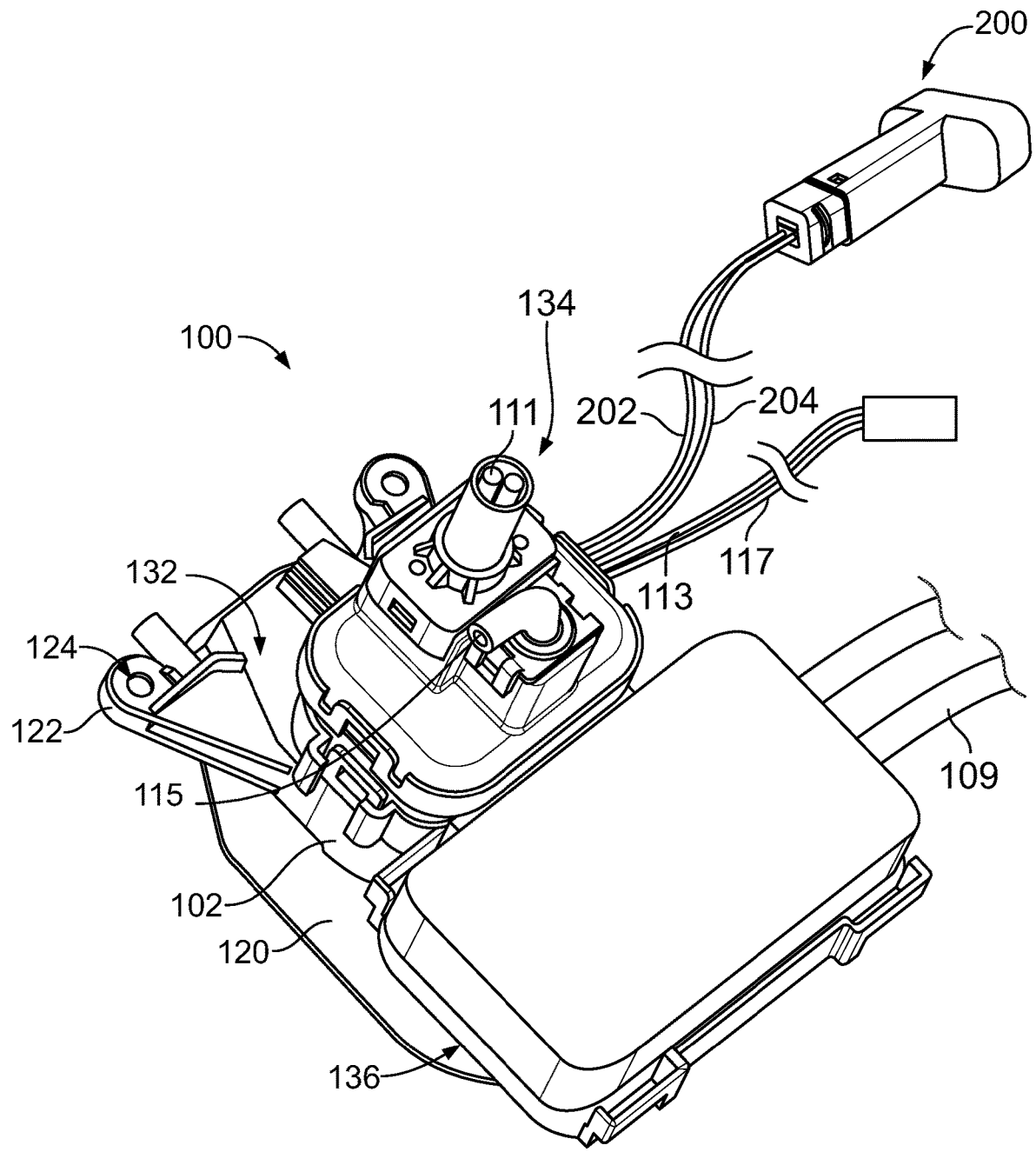
FIG. 2 is a rear perspective view of the charging inlet assembly in accordance with an exemplary embodiment.

FIG. 1 is a front perspective view of a charging inlet assembly 100 in accordance with an exemplary embodiment. FIG. 2 is a rear perspective view of the charging inlet assembly 100 in accordance with an exemplary embodiment. The charging inlet assembly 100 defines a power connector configured to be electrically connected to a charging connector (not shown) for charging a battery system of a vehicle, such as an electric vehicle (EV) or hybrid electric vehicle (HEV). In an exemplary embodiment, the charging inlet assembly 100 is configured for mating with a DC fast charging connector, such as the SAE combo CCS charging connector, in addition to AC charging connectors, such as the SAE J1772 charging connector.

The charging inlet assembly 100 includes a housing 102 configured to be mounted in the vehicle. The housing 102 forms a portion of the power connector for mating with the charging connector. In an exemplary embodiment, the housing 102 defines an AC charging portion 104 and a DC charging portion 106. The charging portions 104, 106 may form receptacles or openings that receive a plug of the charging connector.

The AC charging portion 104 is configured for mating with an AC charging connector or an AC section of the charging connector. The charging inlet assembly 100 includes AC power terminals 108 (FIG. 1) at the AC charging portion 104, such as a pair of the AC power terminals 108. The AC power terminals 108 are configured to be electrically connected to the AC charging connector. The charging inlet assembly 100 includes AC power wires 109 (FIG. 2) electrically connected to the AC power terminals 108. The AC power wires 109 may be terminated directly to the AC power terminals 108, such as being crimped or welded to the AC power terminals 108. In other embodiments, the AC power wires 109 may be electrically connected to the AC power terminals 108 through a separable interface, such as through connectors mated to the housing 102 at the rear.

The DC charging portion 106 is configured for mating with a DC charging connector or a DC section of the charging connector. The charging inlet assembly 100 includes DC power terminals 110 at the DC charging portion 106, such as a pair of the DC power terminals 110. The charging inlet assembly 100 includes a proximity terminal 112 at the DC charging portion 106. The charging inlet assembly 100 includes a ground terminal 114 at the DC charging portion 106. The charging inlet assembly 100 includes a communication terminal 116 at the DC charging portion 106. The DC power terminals 110, the proximity terminal 112, the ground terminal 114, and the communication terminal 116 are configured to be electrically connected to the DC charging connector.

The charging inlet assembly 100 includes DC power wires 111 (FIG. 2) electrically connected to the DC power terminals 110. The DC power wires 111 may be terminated directly to the DC power terminals 110, such as being crimped or welded to the DC power terminals 110. In other embodiments, the DC power wires 111 may be electrically connected to the DC power terminals 110 through a separable interface, such as through connectors mated to the housing 102 at the rear.

The charging inlet assembly 100 includes a proximity wire 113 (FIG. 2) electrically connected to the proximity terminal 112. The proximity wire 113 may be terminated directly to the proximity terminal 112, such as being crimped or welded to the proximity terminal 112. In other embodiments, the proximity wire 113 may be electrically connected to the proximity terminal 112 through a separable interface, such as through connectors mated to the housing 102 at the rear.

The charging inlet assembly 100 includes a ground wire 115 (FIG. 2) electrically connected to the ground terminal 114. The ground wire 115 may be terminated directly to the ground terminal 114, such as being crimped or welded to the ground terminal 114. In other embodiments, the ground wire 115 may be electrically connected to the ground terminal 114 through a separable interface, such as through connectors mated to the housing 102 at the rear.

The charging inlet assembly 100 includes a communication wire 117 (FIG. 2) electrically connected to the communication terminal 116. The communication wire 117 may be terminated directly to the communication terminal 116, such as being crimped or welded to the communication terminal 116. In other embodiments, the communication wire 117 may be electrically connected to the communication terminal 116 through a separable interface, such as through connectors mated to the housing 102 at the rear.

The wires 109, 111, 113, 115, 117 extend from the charging inlet assembly 100 to another component of the vehicle, such as the battery system of the vehicle. Optionally, one or more of the wires 109, 111, 113, 115, 117 may be electrically connected to a battery control unit (not shown) of the battery system. The power wires 109, 111 transmit power, such as to the battery of the vehicle. The AC power wires 109 may transmit high voltage for charging the battery and the DC power wires 111 may transmit low voltage for charging the battery. The ground wire 115 may be electrically grounded, such as to a portion of the vehicle. The proximity wire 113 and the communication wire 117 may transmit data between the charging inlet assembly 100 and the battery system, such as data relating to the charging operation. For example, the communication wire 117 may transmit data relating to charging start/stop, operating temperature of the power terminals 108 and/or 110, or other charging data. The proximity wire 113 may send a proximity signal to the battery system indicating when the charging device is mated to the power connector of the charging inlet assembly 100.

The charging inlet assembly 100 includes a mounting flange 120 coupled to the housing 102. The mounting flange 120 is used to couple the charging inlet assembly 100 to the vehicle. The mounting flange 120 includes mounting tabs 122 having openings 124 that receive fasteners (not shown) used to secure the charging inlet assembly 100 to the vehicle. Other types of mounting features may be used to secure the charging inlet assembly 100 to the vehicle. The mounting flange 120 may include a seal to seal the charging inlet assembly 100 to the vehicle.

In an exemplary embodiment, the charging inlet assembly 100 includes a terminal cover 126 (FIG. 1) at a front 130 of the housing 102. The terminal cover 126 is hingedly coupled to the mounting flange 120 and/or the housing 102. The terminal cover 126 is used to cover portions of the housing 102, such as the power connector. The terminal cover 126 may be used to cover the AC power terminals 108 and/or the DC power terminals 110, which are located in corresponding terminal channels 128 in the housing 102. The housing 102 may include one or more rear covers at a rear 132 of the housing 102 that closes access to the rear 132 of the housing 102. The rear cover(s) may be clipped or latched onto the main part of the housing 102, such as using clips or latches. Other types of securing features, such as fasteners may be used in alternative embodiments.

In an exemplary embodiment, the charging inlet assembly 100 includes one or more low-voltage connectors 134 (FIG. 2) configured to be coupled to the housing 102 at the rear 132. The low voltage connector(s) 134 are configured to be electrically connected to the DC portion, such as the DC power terminals 110 and/or the proximity terminal 112, the ground terminal 114, and the communication terminal 116. The wires 111, 113, 115, 117 may form portions of the low voltage connector(s) 134. The low-voltage connectors 134 are configured to be coupled to other components in the system, such as a battery distribution unit, to control charging of the vehicle. The low-voltage connectors 134 may transmit/receive signals relating to charging, such as status of connection, status of charge, voltage of charge, and the like. Seals may be provided at the interface between the low-voltage connectors 134 and the housing 102.

In an exemplary embodiment, the charging inlet assembly 100 includes one or more high-voltage connectors 136 (FIG. 2) configured to be coupled to the housing 102 at the rear 132. The high voltage connector(s) 136 are configured to be electrically connected to the AC portion, such as the AC power terminals 108. The wires 109 may form portions of the high voltage connector(s) 136. The high voltage connector(s) 136 are configured to be coupled to other components in the system, such as the battery of the vehicle. Seals may be provided at the interface between the high voltage connector(s) 136 and the housing 102.

In an exemplary embodiment, the charging inlet assembly 100 includes a resistor module 200. The resistor module 200 provides a voltage drop, such as from +12 V to +9 V, when the charging connector is coupled to the vehicle and activates charging. In an exemplary embodiment, the resistor module 200 is separate from the housing 102 and coupled to the charging inlet assembly 100 by a first wire 202 and a second wire 204. The first wire 202 may be a proximity wire electrically connected to the proximity terminal 112. The first wire 202 may be referred to hereinafter as a proximity wire 202. The second wire 204 may be a ground wire electrically connected to the ground terminal 114. The second wire 204 may be referred to hereinafter as a ground wire 204. The resistor module 200 may be mounted to the exterior of the housing 102 or may be mounted to another portion of the vehicle, such as remote from (spaced apart from) the housing 102.

Figure 3:
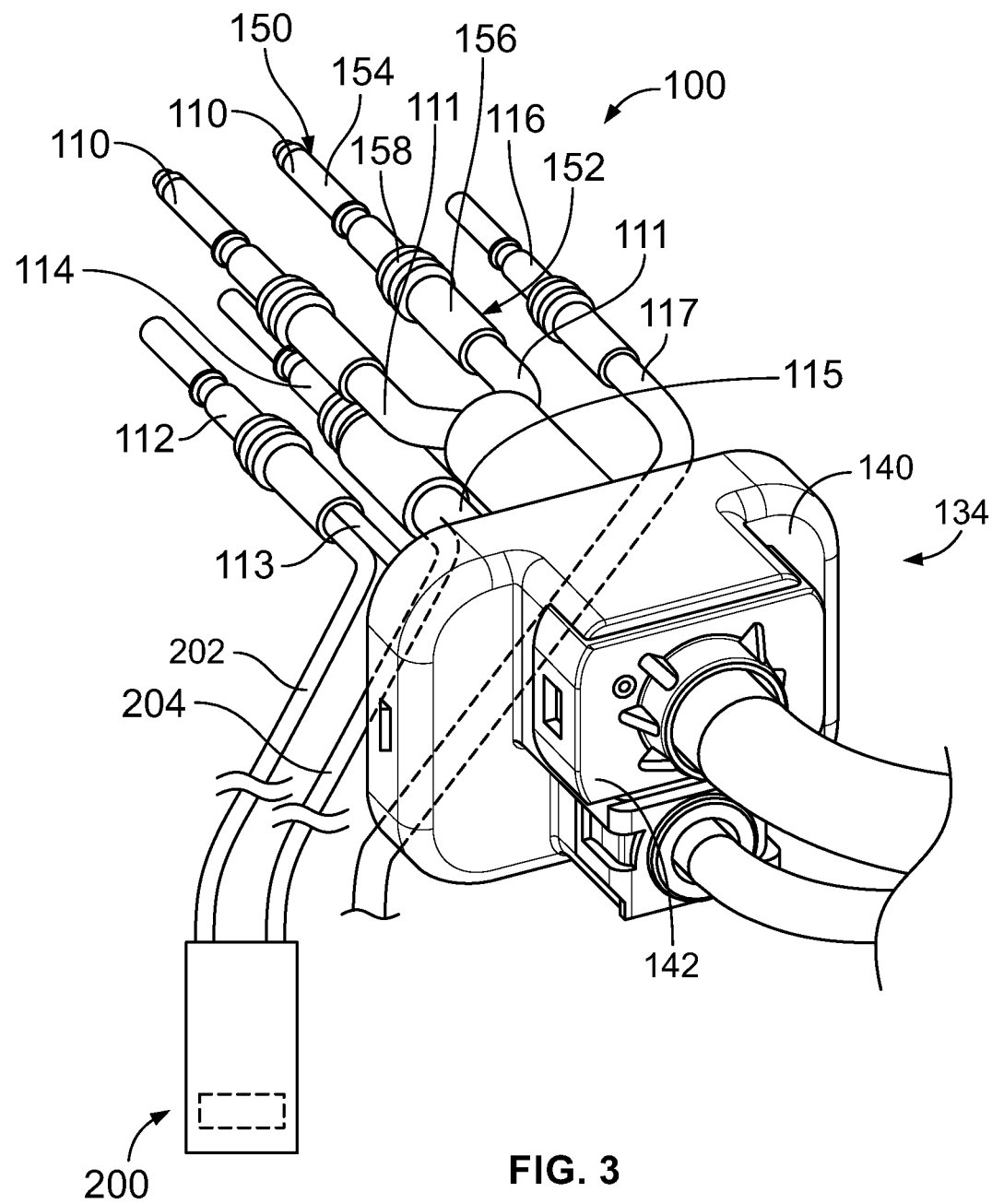
FIG. 3 illustrates a portion of the charging inlet assembly in accordance with an exemplary embodiment.

FIG. 3 illustrates a portion of the charging inlet assembly 100 in accordance with an exemplary embodiment showing the low-voltage connector 134, including various wires and terminals, and the resistor module 200. The low-voltage connector 134 includes a shroud 140 configured to be coupled to the housing 102 (shown in FIG. 2). The shroud 140 holds one or more of the wires, such as the wires 111 and 115 and allows the wires 111, 115 to exit the housing 102. The shroud 140 may additionally or alternatively hold the wires 113, 117. In other various embodiments, the wires 113 and/or 117 may be held by other shrouds (not shown) to allow the wires 113, 117 to exit the housing 102. The wires 111, 115 are supported at the shroud 140 by covers 142. The covers 142 may include seals configured to be sealed against the shroud 140 and/or the wires 111, 115.

The wires 111, 113, 115, 117 are terminated to the corresponding terminals 110, 112, 114, 116. In an exemplary embodiment, each terminal 110, 112, 114, 116 includes a mating end 150 and a terminating end 152. The mating end 150 includes a pin 154 configured for mating with the charging connector. The terminating end 152 includes a wire barrel 156 configured to receive the corresponding wire. The wire barrel 156 may be crimped or welded to the corresponding wire. Other types of termination ends may be provided in alternative embodiments, such as a weld pad. The wire barrel 156 may have a seal 158 configured to be sealed against the housing 102, such as in the corresponding terminal channel 128. While each of the terminals 110, 112, 114, 116 are illustrated as being similar terminals, it is possible that one or more of the terminals 110, 112, 114, 116 may be different types in alternative embodiments.

In an exemplary embodiment, the resistor module 200 is electrically connected to the proximity terminal 112 and the ground terminal 114. The proximity wire 202 is terminated to the proximity terminal 112 and the ground wire 204 is terminated to the ground terminal 114 (however, the ground wire 204 may be terminated to another electrically grounded structure electrically commoned with the ground terminal 114 in alternative embodiments). In the illustrated embodiment, both proximity wires 202, 113 are terminated to the terminating end 152 of the proximity terminal 112. For example, ends of both proximity wires 202, 113 may be crimped within the wire barrel 156. The proximity wire 202 is a first proximity wire and the proximity wire 113 is a second proximity wire. The first and second wires 202, 113 extend to different devices. For example, the first proximity wire 202 extends to the resistor module 200 and the second proximity wire 113 extends to another device, such as the battery distribution unit. In the illustrated embodiment, both ground wires 204, 115 are terminated to the terminating end 152 of the ground terminal 114. For example, ends of both ground wires 204, 115 may be crimped within the wire barrel 156. The ground wire 204 is a first ground wire and the ground wire 115 is a second ground wire. The first and second wires 204, 115 extend to different devices. For example, the first ground wire 202 extends to the resistor module 200 and the second ground wire 113 extends to another device, such as a grounded structure of the vehicle, such as the frame of the vehicle.

FIG. 4 is an exploded view of the resistor module 200 in accordance with an exemplary embodiment. FIG. 5 is an assembled view of the resistor module 200 in accordance with an exemplary embodiment. The resistor module 200 provides a voltage drop, such as from +12 V to +9 V, when the charging connector is coupled to the vehicle and activates charging.

The resistor module 200 includes the proximity wire 202, the ground wire 204, a resistor module housing 210, a proximity contact 212, a ground contact 214, and a resistor element 216. The proximity contact 212 and the ground contact 214 are configured to be electrically connected to the proximity wire 202 and the ground wire 204. The proximity contact 212 and the ground contact 214 are configured to be electrically connected to the resistor element 216. The proximity contact 212 and the ground contact 214 are electrically connected through the resistor element 216.

The resistor module housing 210 holds the proximity contact 212, the ground contact 214, and the resistor element 216. The resistor module housing 210 extends between a first end 220 and a second end 222 opposite the first end 220. The resistor module housing 210 includes an inner cavity 224. The proximity contact 212, the ground contact 214, and the resistor element 216 are located in the inner cavity 224. The wires 202, 204 may extend into the inner cavity 224.

In an exemplary embodiment, the resistor module housing 210 is a multi-piece housing. The resistor module housing 210 includes an outer housing 230 defining the inner cavity 224, an inner housing 232 received in the outer housing 230, and an end cap 233 received in the outer housing 230. The end cap 233 is used to close out and/or seal the end of the inner cavity 224. The end cap 233 is provided at the second end 222. In various embodiments, the end cap 233 may be separately formed and loaded into the second end 222. In other various embodiments, the end cap 233 may be formed in place in the inner cavity 224, such as being epoxy or molding material loaded into the outer housing 230 to close off and seal the inner cavity 224.

In an exemplary embodiment, the inner housing 232 is provided at the first end 220. The inner housing 232 may be plugged into the outer housing 230 at the first end 220. In various embodiments, a perimeter seal 234 is provided between the inner housing 232 and the outer housing 230 configured to seal against the inner housing 232 and the outer housing 230, such as to seal the inner cavity 224 at the first end 220. In an exemplary embodiment, a latch or other securing feature 236 is used to secure the inner housing 232 and the outer housing 230.

The wires 202, 204 extend into a wire end 240 of the inner housing 232, such as into channels 238. In various embodiments, portions of the proximity contact 212 and the ground contact 214 extend into a plug end 242 of the inner housing 232, such as into the channels 238. The inner housing 232 may hold the proximity contact 212 and the ground contact 214 at the plug end 242. The proximity contact 212 and the ground contact 214 may be electrically connected to the wires 202, 204 in the inner housing 232. For example, the wires 202, 204 may be crimped, soldered, or welded to the proximity contact 212 and the ground contact 214. In other various embodiments, contacts (not shown) may be provided at ends of the wires 202, 204 that are electrically connected to the proximity contact 212 and the ground contact 214. For example, the contacts may be socket contacts that receive ends of the proximity contact 212 and the ground contact 214.

The proximity contact 212 is received in the inner cavity 224 and held by the resistor module housing 210. The proximity contact 212 includes a mating end 250 and a wire end 252. The wire end 252 is configured to be connected to the proximity wire 202, either directly or indirectly through another contact (e.g., socket contact). The proximity contact 212 is electrically connected to the proximity terminal 112 (FIG. 3) through the proximity wire 202. In the illustrated embodiment, the wire end 252 includes a pin 254 configured to be plugged into a socket held in the inner housing 232. Other types of interfaces may be provided at the wire end 252, such as a solder pad, a crimp barrel, or other type of interface. The body of the proximity contact 212 may be coupled to the outer housing 230, such as being loaded into channels formed in the outer housing 230. The mating end 250 is configured to be coupled to the resistor element 216. In the illustrated embodiment, the mating end 250 includes an insulation displacement contact interface 256 coupled to the resistor element 216. The insulation displacement contact interface 256 may be press-fit or compression coupled to the resistor element 216. Other types of interfaces may be provided in alternative embodiments to couple to the resistor element 216, such as a solder pad.

The ground contact 214 is received in the inner cavity 224 and held by the resistor module housing 210. The ground contact 214 includes a mating end 260 and a wire end 262. The wire end 262 is configured to be connected to the ground wire 204, either directly or indirectly through another contact (e.g., socket contact). The ground contact 214 is electrically connected to the ground terminal 114 (FIG. 3) through the ground wire 204. In the illustrated embodiment, the wire end 262 includes a pin 264 configured to be plugged into a socket. Other types of interfaces may be provided at the wire end 262, such as a solder pad, a crimp barrel, or other type of interface. The body of the ground contact 214 may be coupled to the outer housing 230, such as being loaded into channels formed in the outer housing 230. The mating end 260 is configured to be coupled to the resistor element 216. In the illustrated embodiment, the mating end 260 includes an insulation displacement contact interface 266 coupled to the resistor element 216. The insulation displacement contact interface 266 may be press-fit or compression coupled to the resistor element 216. Other types of interfaces may be provided in alternative embodiments to couple to the resistor element 216, such as a solder pad.

The resistor element 216 is received in the inner cavity 224 of the resistor module housing 210. The resistor element 216 may be completely enclosed by the resistor module housing 210. The resistor element 216 is coupled to the mating end 250 of the proximity contact 212 and the mating end 260 of the ground contact 214. In an exemplary embodiment, the resistor element 216 includes a first lead 270 and a second lead 272. The mating end 250 of the proximity contact 212 is coupled to the first lead 270. The mating end 260 of the ground contact 214 is coupled to the second lead 272. The resistor element 216 is configured to be electrically connected to the proximity terminal 112 through the proximity wire 202 and the proximity contact 212. The resistor element 216 is configured to be electrically connected to the ground terminal 114 through the ground wire 204 and the ground contact 214.

During assembly, the inner housing 232 is plugged into the first end of the outer housing 230. The proximity contact 212 and the ground contact 214 may be coupled to the inner housing 232 and loaded into the inner cavity 224 with the inner housing 232. Alternatively, the proximity contact 212 and the ground contact 214 are loaded into the inner cavity 224 through the second end 222 after the inner housing 232 is plugged into the outer housing 230 to mate with the socket contacts (not shown) held by the inner housing 232. During assembly, the resistor element 216 is loaded into the inner cavity 224 to mate with the proximity contact 212 and the ground contact 214. The end cap 233 is coupled to the second end 222 to close off and seal the inner cavity 224.

The resistor module 200 is configured to be electrically connected to the proximity terminal 112 and the ground terminal 114 (or associated grounded component). In an exemplary embodiment, the resistor element 216 is electrically connected to the proximity terminal 112 through the proximity wire 202 and the proximity contact 212 and electrically connected to the ground terminal 114 through the ground wire 204 and the ground contact 214. In an exemplary embodiment, the resistor element 216 is located remote from the charging inlet assembly 100. For example, the resistor element 216 is configured to be located remote from the housing 102 of the charging inlet assembly 100, such as exterior of the housing 102. The proximity wire 202 and the ground wire 204 extend from the first end 220 of the resistor module housing 210, such as into the housing 102 to terminate to the to the proximity terminal 112 and the ground terminal 114. The proximity wire 202 and the ground wire 204 are flexible between the resistor module housing 210 and the housing 102 allowing the resistor module 200 to be manipulated and separately mounted to a structure, such as the exterior of the housing 102 or to another portion of the vehicle. In an exemplary embodiment, the resistor module housing 210 includes a mounting bracket 280. The mounting bracket 280 is used to mount the resistor module 200 to the structure. In various embodiments, the mounting bracket 280 is mounted to an exterior of the housing 102. In other various embodiments, the mounting bracket 280 is mounted to a portion of the vehicle remote from the charging inlet assembly, such as a frame of the vehicle.

The resistor module housing 210 provides a dedicated housing for the resistor element 216. The resistor element 216 is able to be located outside of the housing 102 of the charging inlet assembly 100. As such, the housing 102 may be downsized compared to a charging inlet housing that needs to house a resistor element. The resistor element 216 is coupled directly to the contacts 212, 214. In an exemplary embodiment, a circuit board is not needed for the resistor element 216. As such, the housing 102 may be downsized compared to a charging inlet housing that needs to house a circuit board.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A resistor module for a charging inlet assembly of an electric vehicle, the resistor module comprising:
    a resistor module housing having a first end and a second end opposite the first end, the resistor module housing having an inner cavity;
    a proximity contact received in the inner cavity and held by the resistor module housing, the proximity contact including a mating end and a wire end, the wire end of the proximity contact being connected to a proximity wire configured to be electrically connected to a proximity terminal of the charging inlet assembly;
    a ground contact received in the inner cavity and held by the resistor module housing, the ground contact including a mating end and a wire end, the wire end of the ground contact being connected to a ground wire configured to be electrically connected to a ground terminal of the charging inlet assembly; and
    a resistor element received in the inner cavity of the resistor module housing, the resistor element being coupled to the mating end of the proximity contact and the mating end of the ground contact;
    wherein the resistor element is configured to be electrically connected to the proximity terminal of the charging inlet assembly through the proximity wire and the proximity contact, and wherein the resistor element is configured to be electrically connected to the ground terminal of the charging inlet assembly through the ground wire and the ground contact.

2. The resistor module of claim 1, wherein the resistor element is located remote from the charging inlet assembly.

3. The resistor module of claim 1, wherein the proximity wire and the ground wire extend from the first end of the resistor module housing to the charging inlet assembly.

4. The resistor module of claim 1, wherein the proximity wire and the ground wire are flexible between the resistor module housing and the charging inlet assembly.

5. The resistor module of claim 1, wherein the resistor module housing includes a mounting bracket, the mounting bracket being mounted to an exterior of a charging inlet housing of the charging inlet assembly.

6. The resistor module of claim 1, wherein the resistor module housing includes a mounting bracket, the mounting bracket being mounted to the electric vehicle remote from the charging inlet assembly.

7. The resistor module of claim 1, wherein the mating end of the proximity contact includes an insulation displacement contact interface coupled to the resistor element, and wherein the mating end of the ground contact includes an insulation displacement contact interface coupled to the resistor element.

8. The resistor module of claim 1, wherein the resistor element includes a first lead and a second lead, the mating end of the proximity contact being coupled to the first lead, the mating end of the ground contact being coupled to the second lead.

9. The resistor module of claim 1, wherein the resistor module housing includes an outer housing defining the inner cavity and an inner housing received in the outer housing, the inner housing holding the proximity contact and the ground contact.

10. The resistor module of claim 9, wherein the resistor module housing includes a perimeter seal between the inner housing and the outer housing.

11. The resistor module of claim 1, wherein the resistor module housing includes an end cap closing the inner cavity and sealing the resistor element in the resistor module housing.

12. A charging inlet assembly for an electric vehicle comprising:
    a charging inlet housing extending between a front and a rear, the charging inlet housing having a chamber at the rear, the housing having a power connector at the front for receiving a charging connector, the power connector including terminal channels between the front and the rear;
    power terminals coupled to the housing, each of the power terminals including a mating pin and a terminating end opposite the mating pin, the mating pin positioned in the corresponding terminal channel for mating with the charging connector, the terminating end positioned in the chamber at the rear of the housing;
    a proximity terminal coupled to the housing, the proximity terminal including a mating pin and a terminating end opposite the mating pin, the mating pin of the proximity terminal positioned in the corresponding terminal channel for mating with the charging connector, the terminating end of the proximity terminal positioned in the chamber at the rear of the housing;
    a ground terminal coupled to the housing, the ground terminal including a mating pin and a terminating end opposite the mating pin, the mating pin of the ground terminal positioned in the corresponding terminal channel for mating with the charging connector, the terminating end of the ground terminal positioned in the chamber at the rear of the housing; and a resistor module including a resistor module housing having an inner cavity, a proximity contact received in the inner cavity and held by the resistor module housing, a ground contact received in the inner cavity and held by the resistor module housing, and a resistor element received in the inner cavity of the resistor module housing, the proximity contact connected to a proximity wire electrically connected to the proximity terminal of the charging inlet assembly, the ground contact connected to a ground wire electrically connected to the ground terminal of the charging inlet assembly, the resistor element being coupled to the proximity contact and the ground contact, wherein the resistor element is electrically connected to the proximity terminal through the proximity wire and the proximity contact, and wherein the resistor element is electrically connected to the ground terminal through the ground wire and the ground contact.

13. The charging inlet assembly of claim 12, further comprising a first wire and a second wire, wherein the proximity wire and the first wire are both electrically coupled to and extend from the proximity terminal to an exterior of the charging inlet housing, and wherein the ground wire and the second wire are both electrically coupled to and extend from the ground terminal to an exterior of the charging inlet housing.

14. The charging inlet assembly of claim 13, wherein the proximity wire and the first wire are both crimped to the proximity terminal, and wherein the ground wire and the second wire are both crimped to the ground terminal.

15. The charging inlet assembly of claim 12, wherein the resistor element is located exterior of and remote from the charging inlet housing.

16. The charging inlet assembly of claim 12, wherein the proximity wire and the ground wire extend between the resistor module housing and the charging inlet housing.

17. The charging inlet assembly of claim 12, wherein the resistor module housing includes a mounting bracket, the mounting bracket being mounted to an exterior of the charging inlet housing.

18. The charging inlet assembly of claim 12, wherein the resistor module housing includes a mounting bracket, the mounting bracket being mounted to the electric vehicle remote from the charging inlet assembly.

19. The charging inlet assembly of claim 12, wherein the resistor module housing includes an outer housing defining the inner cavity and an inner housing received in the outer housing, the inner housing holding the proximity contact and the ground contact.

20. A charging inlet assembly for an electric vehicle comprising:

a charging inlet housing extending between a front and a rear, the charging inlet housing having a chamber at the rear, the housing having a power connector at the front for receiving a charging connector, the power connector including terminal channels between the front and the rear;

power terminals coupled to the housing, each of the power terminals including a mating pin and a terminating end opposite the mating pin, the mating pin positioned in the corresponding terminal channel for mating with the charging connector, the terminating end positioned in the chamber at the rear of the housing;

a proximity terminal coupled to the housing, the proximity terminal including a mating pin and a terminating end opposite the mating pin, the mating pin of the proximity terminal positioned in the corresponding terminal channel for mating with the charging connector, the terminating end of the proximity terminal positioned in the chamber at the rear of the housing;

a ground terminal coupled to the housing, the ground terminal including a mating pin and a terminating end opposite the mating pin, the mating pin of the ground terminal positioned in the corresponding terminal channel for mating with the charging connector, the terminating end of the ground terminal positioned in the chamber at the rear of the housing; and a resistor module including a resistor element electrically connected to the proximity terminal and the ground terminal, the resistor element being located exterior of the charging inlet housing.

* * * * *